(12) United States Patent
Guinovart

(10) Patent No.: US 12,223,354 B2
(45) Date of Patent: Feb. 11, 2025

(54) PATTERN RECOGNITION SYSTEM, METHOD AND COMPUTER READABLE STORAGE MEDIUM UTILIZING SELF-REPLICATING NODES BASED ON SIMILARITY MEASURE AND STORED TUPLES

(71) Applicant: Avatar Cognition Barcelona S.L., Barcelona (ES)

(72) Inventor: Enric Guinovart, Barcelona (ES)

(73) Assignee: Avatar Cognition Barcelona S.L., Barcelona (ES)

(*) Notice: Subject to any disclaimer, the term of this patent is extended or adjusted under 35 U.S.C. 154(b) by 536 days.

(21) Appl. No.: 17/391,575

(22) Filed: Aug. 2, 2021

(65) Prior Publication Data

US 2022/0035675 A1 Feb. 3, 2022

Related U.S. Application Data

(60) Provisional application No. 63/060,092, filed on Aug. 2, 2020.

(51) Int. Cl.
*G06F 9/50* (2006.01)
*G06N 20/00* (2019.01)

(52) U.S. Cl.
CPC ............ *G06F 9/5027* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,336,774 B1* | 5/2016 | Kurzweil | ............... | G06F 18/295 |
| 9,769,007 B1* | 9/2017 | Dutch | ...................... | G06F 11/00 |
| 10,521,586 B2* | 12/2019 | Berthier | .................. | H04L 9/003 |
| 11,816,167 B1* | 11/2023 | Doyle | .................... | G06N 5/022 |
| 2005/0008227 A1* | 1/2005 | Duan | .................. | G06F 18/2113 |
| | | | | 382/195 |
| 2007/0085790 A1* | 4/2007 | Chung | ..................... | G09G 3/20 |
| | | | | 345/88 |
| 2009/0319517 A1* | 12/2009 | Guha | .................... | G06F 16/951 |
| | | | | 707/999.005 |
| 2011/0093534 A1* | 4/2011 | Souza | ................. | H04L 67/1076 |
| | | | | 709/203 |
| 2015/0120739 A1* | 4/2015 | Hosokawa | ............ | G06F 16/285 |
| | | | | 707/740 |
| 2018/0196924 A1* | 7/2018 | Assefa | .................... | G16H 50/30 |
| 2019/0394606 A1* | 12/2019 | Tammi | .................. | G10L 19/008 |

(Continued)

*Primary Examiner* — Meng Ai T An
*Assistant Examiner* — Zujia Xu
(74) *Attorney, Agent, or Firm* — Sterne, Kessler, Goldstein & Fox P.L.L.C.

(57) ABSTRACT

Described herein are embodiments for performing pattern recognition using a hierarchical network. The hierarchical network is made up of fractal cognitive computing nodes that manage their own interconnections and domains in an unsupervised manner. The fractal cognitive computing nodes are also self-replicating and may create new levels within the hierarchical network in an unsupervised manner. The form of signals processed in the hierarchical network may take on the form of key-value pairs. This may allow the hierarchical network to replicate and perform adaptive pattern recognition in non-domain-specific manner with regards to the input signals.

16 Claims, 5 Drawing Sheets

(56) References Cited

U.S. PATENT DOCUMENTS

| 2020/0089623 A1* | 3/2020 | Chen | G06F 12/1081 |
| 2021/0150146 A1* | 5/2021 | Alexander | G06F 40/30 |
| 2021/0239878 A1* | 8/2021 | Chang | E21B 49/06 |
| 2021/0297480 A1* | 9/2021 | Shi | H04L 69/14 |

* cited by examiner

PATTERN RECOGNITION SYSTEM, METHOD AND COMPUTER READABLE STORAGE MEDIUM UTILIZING SELF-REPLICATING NODES BASED ON SIMILARITY MEASURE AND STORED TUPLES

CROSS-REFERENCE TO RELATED APPLICATIONS

This application claims the benefit of U.S. Provisional Patent Application No. 63/060,092, filed on Aug. 2, 2020, which is incorporated by reference herein in its entirety.

TECHNICAL FIELD

This application relates generally to the field of using hierarchical networks based on self-replicating nodes to perform non-domain-specific and adaptive pattern recognition.

BACKGROUND

Pattern analysis may be performed on data by processing elements. Where data is made up of discretized or symbolic combinations at multiple levels of interpretation, processing elements may be arranged to analyze the data at more than one level. Complex systems may pass information bi-directionally between processing nodes at the various levels. A central analysis system may implement and control a hierarchical structure to accomplish this. This may include dynamically generating the analysis processing structure at each level and the interconnections between the various levels.

The resulting processes may start with the creation of nodes at lowest levels, representing the most basic or atomic symbolic information items observed. The centralized engine incrementally and recursively creates a parent nodes from the bottom up based on specific prior knowledge of the specific semantic domain. The centralized engine may update the structure into a hierarchical interpreted representation of the domain, to be used as a symbolic hierarchical classification-based ontology.

Such systems have several shortcomings. First, input data is assumed to be a discretized data structure, which implicitly correlates coded values with pre-assumed arbitrary semantics, making the system blind to semantic relationships between data items, and therefore, unable to perform semantic-based processing. Second, prior knowledge of the specific semantic domain is required to provide the system the domain-specific interpretation criteria to be capable of self-organization. Third and consequently, the system needs a centralized processing component to mitigate first and second shortcomings including analytical or genetical exploration external techniques, which make it more difficult for the system to perform in a continuous-time mode of operation,

BRIEF SUMMARY

Provided herein are system, method and/or computer program product embodiments, and/or combinations and sub-combinations thereof for performing hierarchical pattern recognition using self-replicating nodes in a non-domain-specific and adaptive way.

Some embodiments provide a pattern recognition system that has processors and memory communicatively coupled together. The memory may store instructions configured to implement a set of fractal cognitive computing nodes (FCNs). These FCNs may be configured into a hierarchical network, with the set of FCNs having child FCNs at lower levels of the hierarchical network coupled to parent FCNs at higher levels of the hierarchical network. Each lower level of the hierarchical network may have a higher resolution or precision than each higher level of the hierarchical network.

The hierarchical network may start with a single seed node or FCN at a highest level and recursively self-replicate to create child FCNs in a hierarchical organization, coupling each parent to none or any number of children and where each lower level of the hierarchical network may have a higher similarity resolution or precision than each higher level of the hierarchical pathway, with criteria to be used by the processors in the FCNs to modulate the method performed in the FCNs.

The child FCNs may provide a set of tuples or signals to a parent FCN connected thereto and receive a set of tuples from the parent FCN. The parent FCNs may receive tuples from and provide a set of tuples to the child FCNs connected thereto. Each of these tuples may contain a key and a value, the key being an identifier of an input or output source and the value being a magnitude of activation of the source. The combination of the key and value provides an essential tuple definition that, instead of providing codes, symbols, or discretization, instead provides semantics expressed by the relationships of activation of arbitrary number of dimension identifiers ("simulated axons" information entity).

Each FCN may determine a similarity measure between each stored tuple in the memory and each tuple in a set of input tuples, which may include a set of tuples received from a child FCN, a set of tuples received from a parent FCN, or both, and compare their similarity measure to a spatial attention (SA) parameter or similarity threshold.

When the similarity measure is lower than the SA parameter for all tuples stored in memory, the FCN may add the set of input tuples to the stored set of tuples in the memory and a set of output tuples, which is communicated to the FCN in the upper and lower levels, if any. When the similarity measure is greater than the SA parameter for any tuples stored in memory, each such tuple is added to a set of output tuples, which are communicated to the FCN in the upper and lower levels.

Each FCN is self-replicating and may replicate itself into one or more respective child FCNs at a respective lower level, producing a top-down growth method based on the content of the stored set of tuples in the memory. The FCNs replicate based on internal criteria, rather than external control and based on semantic or relationships between simulated axons.

The pattern recognition system is also configured to receive input tuples from or send output tuples to sources external to the FCNs. This may include FCNs with no child FCNs no parent FCNs. In some embodiments, some or all FCNs may be connected to external sources for input or output. These tuples may be input or output data from sensors, actuators or data files.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

Figure 1:
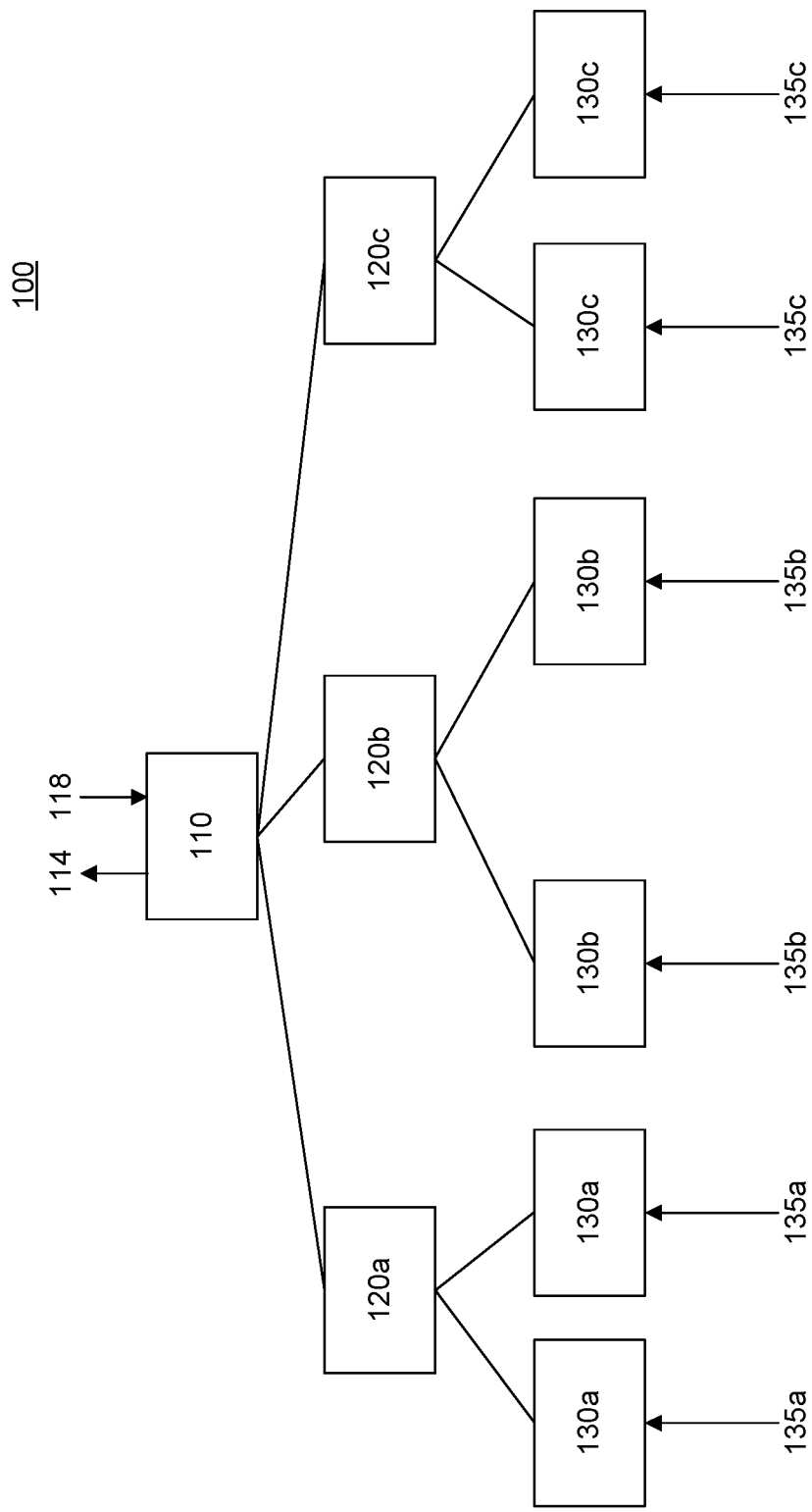
FIG. 1 illustrates a block diagram of a hierarchical network, according to some embodiments.

In the drawings, the leftmost digit(s) of a reference number identifies the drawing in which the reference number first appears.

DETAILED DESCRIPTION

Provided herein are system, method and/or computer program product embodiments, and/or combinations and sub-combinations thereof for performing hierarchical pattern recognition using self-replicating nodes to perform non-domain-specific and adaptive semantic pattern recognition.

Data may contain patterns at multiple levels of granularity. Processing of such data may be performed at each level to identify the respective patterns. However, in some cases, patterns recognized at each level may inform the patterns at the other levels.

For example, spoken language may contain a pattern at the levels of a sound discretization at a phoneme, a combination of phonemes in a word, a combination of words in a sentence, a combination of sentences into a paragraph, and so on. Pattern recognition of spoken language may involve identifying the different phonemes and breaking them into the words, sentences, and so on. Identifying such patterns may be used, for example, to capture relationships between symbol-based compositions at several levels of aggregation. The interrelationship between the phonemes, words, and so forth means that the pattern, or the text, may be more accurately identified by processing at the different levels and passing information between those levels.

One approach for performing such processing is to use a hierarchical network, where each level of the hierarchy processes a different level of the data. Interconnections between adjacent levels allow the exchange of information. These interconnections may need to change as the pattern is detected to better reflect the patterns or relationships in the data. Further, the number of levels in the hierarchy may need to change based on the type of data or its content. A central processing system may control the initialization of the hierarchical network and the dynamic adjustment of the connections or number of levels in the network.

A specific implementation uses a central processing system with a genetic algorithm and a hidden Markov model (HMM) to generate an initial topology for the hierarchical network model. The genetic algorithm may be used to dynamically modify the interconnections as the processing proceeds. The HMM may generate new levels of the hierarchy as needed based on the type of data. The details of this system are more particularly described in U.S. Pat. No. 9,336,774 (the '774 patent), which is incorporated herein by reference in its entirety.

The use of the systems like the ones described above and in the '774 patent may be effective for performing the pattern analysis described above. However, it also suffers from a number of shortcomings. The '774 patent uses symbolic representations of the data, which may rely on interpreted ontologies, such as relational probabilistic representations like HMMs. Input data is assumed to be a discretized data structure, which implicitly correlates coded values with pre-assumed arbitrary semantics, making the system blind to semantic relationships between data items, and therefore, unable to perform semantic-based processing. Additionally, prior knowledge of the specific semantic domain is required to provide the system the domain-specific interpretation criteria to be capable of self-organization. As a result, the system is not agnostic of the domain of information to which it is connected and is limited to producing domain-specific solutions and unable to capture semantic relationships from symbolic discretizations. Additionally and consequently, the system needs a centralized processing component to mitigate first and second shortcomings including analytical or genetical exploration external techniques, which make more difficult to the system to perform in continuous-time mode of operation.

The hierarchical network processing element, such as the pattern recognizer processors of the '774 patent, must be controlled by a central processing system. This increases the processing overhead. The use of the genetic algorithms and HMIs described in the '774 patent can be computationally complex and may require prior knowledge of the data to properly generate and update the hierarchical network. This also means that any increase in network layers is accomplished by the central processing system Embodiments of the present application make use of features that provide advantages over systems like those in the '774 patent. These features each provide their own advantages, as will be made more clear in the embodiments found below. The overall effect is to overcome the shortcomings of systems like those described in the '774 patent and deliver fully non-domain-specific (general) semantic processing.

One of these, relates to "simulated axons" definition in '774 patent, which are defined as an extendible tuple of discrete attributes or fields. Their use is intended to be able to model a discretization of an information entity, which represents an externally interpretable concept. The proposed redefinition of simulated axons in the present application delivers the simplest specification possible to capture semantics and is based on capturing relationships of synchrony between "simulated axons" based on their values, where each "simulated axon" is reduced to a tuple <identifier, value>. Under this perspective, patterns of concurrent inputs can be compared by semantic similarity. This implies that the new system can only be fed by this n-dimensional encoding, known as distributed representations such sparse distributed representations (SDRs).

Another advantage relates to the method performed by each node of the hierarchy. The '774 patent maintains the relationship-based patterns in a symbol-based HMNI where interpreted probabilistic operations are performed. The present application redefines the operations into a simple similarity comparison, in a new processing element referred to as FCN, between patterns and the substitution of HMIs by a simple array or list of patterns for each node. This redefinition adapts the patter comparison operation to the new definition of "simulated axons" and in order to be able to operate semantically.

This application redefines the processor coupled to each node as the fractal cognitive computing node (FCN). These nodes are used as the processing elements in the hierarchical network, similar to the pattern recognizer processors of the '774 patent. However, as will be made apparent in the description below, the FCNs alter the operation of the pattern-comparison while performing the pattern recognition. Additionally, as the FCN only needs the criteria of similarity to operate semantically, this novel definition allows each FCN to adaptively grow top-down extending the precision of pattern recognition precision to its sub-domain. This capability enables a distributed exploration of semantic complexity of patterns observed from an n-dimensional domain, performing as a semantic extractor of relevant patterns of the domain. The resulting hierarchical representation, which performs a multi-level adaptive similarity scanning without any domain-interpretation criteria, is completely different from that of '774 patent, which performs an interpreted or symbolic classification of information or symbolic ontology.

The FCN operation includes a novel self-replication criterion in order to effectively result into such a described novel hierarchical semantic representation. Each FCN performs a sampling of the observed inputs, creating a list of archetypes at specific level of similarity precision, and uses it to infer an output signal through recalling of stored patterns with an arbitrary input state. If an archetype is recalled often enough, based on threshold precision parameter, at low levels of similarity, its sub-domain (pattern composition of tuples) needs to be explored at higher similarity precision to deeply perform convenient sampling and archetype identification. Therefore, the parent FCN self-replicates into a child FCN connected to input/output dimensions ("simulated axons") based on the mentioned pattern composition and bi-directionally connected to the parent FCN.

Consequently, the use of external systems for prior knowledge, the centralized processing and any exploration or genetic complementary methods are no longer need, but they could be a useful tool for further optimizations.

FIG. 1 illustrates a block diagram of a hierarchical network 100, according to some embodiments. Fractal Cognitive Computing Node (FCN) 110 is a first processing level, FCNs 120a, 120b, and 120c (collectively, FCNs 120) are a second processing level, and FCNs 130a, 130b, and 130 (collectively, FCNs 130) are a third processing level. These FCNs 110, 120, and 130 may be configured to process signals or tuples from other FCNs in the hierarchy and signals from the input/output dimensions ("simulated axons").

Signals or tuples processed by the FCNs 110, 120, and 130 may be composed as set of <key, value> pairs, where the key is an identifier of the tuple (dimension or "simulated axon) and the value is an activation level of associated dimension identifier. Input signals from a continuous-time domain, which change over time, represent one sample the domain or its state. For example, if the signal are connected and encoded as an activation level of a set of pixels representing a black and white image, the domain may be the entire set of pixels, while other domains may be sub-sets of the pixels that are activated for a certain image or images, corresponding to semantic archetypes. Domains that are smaller than the largest domain processed in the hierarchical network may be referred to as sub-domains. At the edges of the hierarchical network 100, meaning the highest or lowest levels of the hierarchical network, inputs and outputs of the hierarchical network may be present, such as inputs 118, 135a, 135b, 135c, and output 114. The inputs 135a, 135b, and 135c may provide input in place of child FCNs for FCNs in the lowest level of the hierarchy, such as the FCNs 130. The input 118 may provide input signals in place of the parent FCN in the highest level of the hierarchy, such as FCN 110. The output 114 in FCN 110 may provide an output signal determined by the hierarchical network 100.

The FCNs 110, 120, and 130 may communicate along connections. For example, FCN 110 may be connected to FCNs 120a, 120b, and 120c, FCN 120a may be connected to FCNs 130a, FCN 120b may be connected to FCNs 130b, and FCN 120c may be connected to FCNs 130c. The specific number of FCNs at each level and the specific connections may depend on the domains of the patterns that are being processed.

For example, if the hierarchical network 100 is processing a signal with a domain of pixels of an image, FCN 110 may process at a domain of the full set of pixels and the lowest level of similarity precision, FCNs 120 process with sub-domains that are activated in certain images, and FCNs 130 may process the signal with sub-domains of the sub-domains activated by different archetype patterns of those images. Those skilled in the art will understand that the exact nature and number of layers and balancing distribution will depend on the latent relational information of data being processed and the content inferred, providing output signals which contain the best experience-based inference of any other dimension in terms of semantic attribute at all level of similarity precision, as will be made more apparent below.

Figure 2:
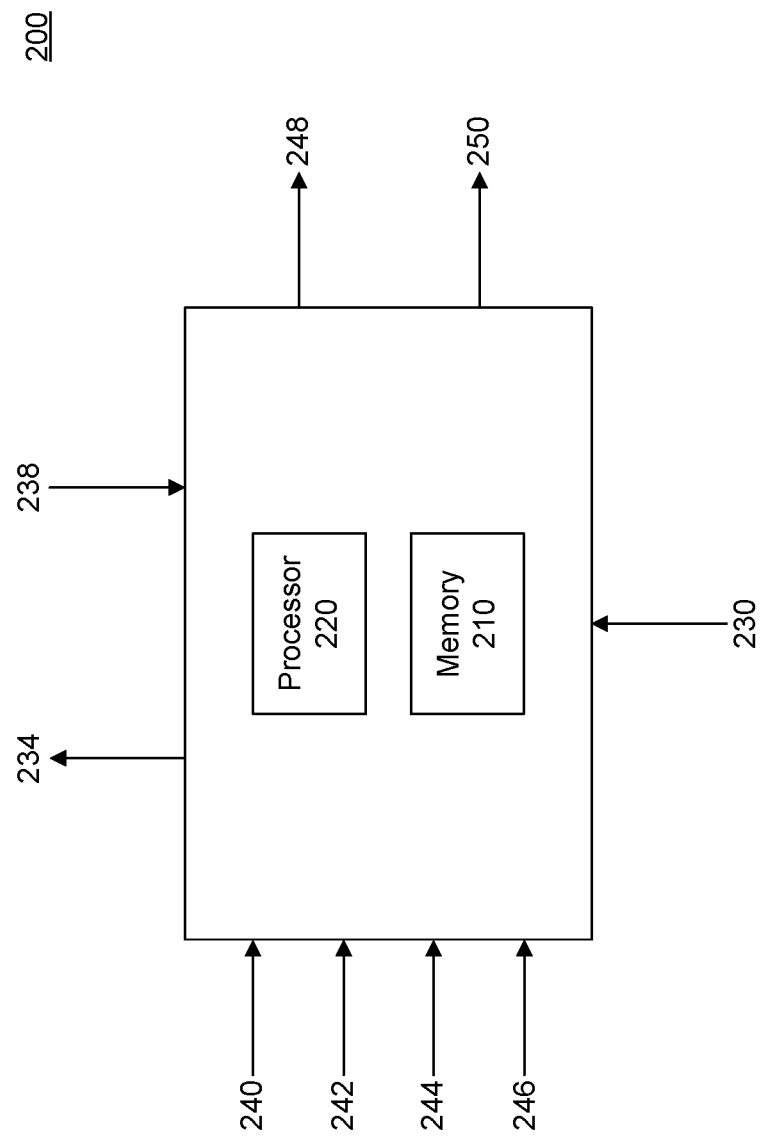
FIG. 2 illustrates a block diagram of a fractal cognitive computing node, according to some embodiments.

FIG. 2 illustrates a fractal cognitive computing node (FCN) 200, according to some embodiments. The FCN 200 may have a memory 210, a processor 220, a first input 230, second input 234, a first output 238, and a spatial attention (SA) input 240. The FCN 200 may be the FCNs 110, 120, and 130 described above.

In some embodiments, the FCN 200 may have a temporal attention (TA) input 242, a conditioning (CD) input 244, a focus (AF) input 246, a confidence (CF) output 248, and a coherence (CH) output 250.

The first input 230 is configured to receive a first input signal. The first input signal may be received from another FCN 200, for example from a child FCN 200 or may be generated by or received from an encoder sensor, for example when the FCN 200 is a leaf of a structure. The data may be a tuple containing a <key, value> pair, as described above, or a variable set of such tuples.

The data being in the <key, value> format allows the interpretation to remain in the data through their relationship of synchrony or co-occurrence that is being processed. This is advantageous over symbolic forms used in some existing approaches, such as those used in the '774 patent. Those symbolic forms may rely on interpreted ontologies, such as relational probabilistic representations, for data processing. Those symbolic forms require external interpretation, such as by the central processing system. In contrast, the <key, value> tuples of embodiments of the present application retain the interpretation of the data locally in the tuple, removing the need for external interpretation.

The second input 234 is configured to receive a second input signal being a first output signal of another FCN 200 and comprising a tuple or a set of tuples. The first output 238 is configured to provide a first output signal comprising a tuple or set of tuples. The first and second input signals and the first output signal may be received or provided in sparse-distributed representation (SDR) or any form or overlapping-distributed representation of any n-dimensional domain.

The SA input 240 is configured to receive an SA parameter comprising a single dimension value. In particular, the SA parameter defines the threshold that is applied in order to drive learning from new signals and the recalling of learned ones. The SA parameter affects the level of detail at which the similarity comparison takes place between input signal and the patterns stored in memory. This threshold drives the precision of archetyping and determines whether a new pattern is stored or an existing one is recalled.

The memory 210 may be configured to store a collection of items or patterns, where each item has a set of tuples <key, value>, and represents a previously stored input from at least one of the first or second input signals. The processor 220 may implement the computational function for performing learning or recalling procedures against all previously learned patterns. To that end, the processor 220 may compare the first input signal, the second input signal or a combination of the first and second input signals to some (or all) of the stored collection of items (in general of a plurality of interconnected FCNs 200) and calculates a similarity measure for each compared item.

The processor 220 selects the first output signal as the selection of items in memory having a similarity measure greater than the SA parameter with the input tuples. The use of the SA parameter may set the precision at which an FCN compares items. The SA parameter may be defined as a fixed or variable value for each FCN 200. If the SA has a very low value (for instance 0.10), the items created in the memory 210 will perform a similarity measure greater than this. Because the similarity measure is low, more items may match, and, therefore, less items will be created in the memory 210. This provides a low simplification of the representational space relative to the actual domain exposure. Consequently, the inference effect or the recall of a specific item in the memory 210 will have lower relevance, since many items will mach.

On the other hand, if the SA parameter has higher values, many items will be created in the memory 210. Fewer items will be matched, but each one will be more relevant since the related inferred tuples of the item recalled based on an input sample are relevantly different at higher precision threshold.

The TA input 242 may have a TA parameter, which comprises a single dimension value, defining the time range that the computational function is applied on. Wider ranges allow the FCN 200 to change the sequence length of pattern processing. When receiving this TA parameter, the processor 220 may modify the value of any tuple stored in the memory 210 by decreasing that value by TA parameter.

The TA parameter may be used to specify a fixed sequencing context that will be considered in the similarity operation. If the TA parameter has a value of one, any "value" of any tuple greater than zero, will be zero in one processing step, producing strict spatial cognition. If the TA has a higher value such as 10, the "value" of greater than zero tuples will be zero progressively after ten processing steps. The overall effect consists in a sequencing or transitional cognition effect, converting a temporal relationship into spatial relationship, since transitional items of the memory 210 will represent spatial transitions at different context depth.

The CD input 244 may have a CD parameter, which comprises a single dimension value, either positive or negative, defines, when positive, a reinforcement level and, when negative, it defines an inhibition level. In this case, each item stored in the memory 210 may comprise a set of tuples <key, value, depth>. The processing unit may modify the depth value of tuples for the selection of compared items by a magnitude defined as an addition or subtraction of the value of said CD parameter.

In some embodiments, tuples may have an additional parameter of depth. The CD parameter may be considered as an accelerator or inhibitor of the depth field of the tuples of each item in the memory 210. In an example sample processing step, if the CD parameter is greater than zero, an increment of the depth value of the selected items in the similarity operation will be proportional to CD parameter value. This may allow for applying a progressive sub-selection process of specific sub-domain based on a kind of reinforcement and inhibition learning, producing a valuable mechanism for short-term adaptation as ontology induction or guidance criteria. This mechanism may be especially valuable when not all the exposed samples of the domain are desired or not in order to be able to capture arbitrary domain ontologies for achieving a target task or behavior.

For example, if a certain targeted output is, through a known or determined mechanism or physical phenomenon, based on some, but not all of the exposed samples in a domain, the CD parameter can be set to a value greater than zero for the exposed samples that affect the targeted output to guide the cognitive function. On the other hand, if the CD parameter is smaller than zero, the effect on the depth values of the selected items by the similarity operation will be temporarily inhibited and therefore, they will be excluded from the current output signal, providing the best next alternative item selection.

The AF input 246 may have an AF parameter that provides a filtering criterion. The processor 220 may modify the value of an output signal by applying this filtering criterion. The AF parameter may be used as a filter operating between the memory items selection from the similarity operation and the final output signal. This may allow for applying specific criteria of sub-selection of current selection, allowing a mechanism of focusable cognition. Depending on the specific AF parameter value set, the projection of inferred signals to the dimensions of the domain may be more reactive, understood as the best similar selection of items in the memory 210 or more focusable or attentional, producing projections more specific on the potential total possible selection.

The CF output 248 may have a CF parameter computed as a statistical grouping function over the similarity measures of the cited selection of compared items. That is, this output parameter may show the value of confidence of the recalled pattern delivered in the first output 238.

The CF parameter may be a measure of the recalling percentage of the similarity function produced in a specific sample processing. For example, if only one item in the memory 210 is recalled, the CF parameter will be equal to the similarity value result of comparing the sample signal to the item tuple composition. If more than one item is selected from the memory 210, the CF parameter value is set to a grouping arithmetic function over the individual similarity measures (CFs), for instance, the average of the individual CFs. Consequently, the CF parameter may be understood as a measure of local recall degree.

The CH output 250 may have CH parameters, which show a measure of difference between the second input signal and the first output signal, understood as a measure of success of cognitive function. As a supplement measure to the CF measure, an FCN 200 can provide another measure related to the quality of cognition, not locally as CF, but structurally contextually to the rest of the FCN hierarchy to which it belongs. The CH parameter is calculated as the similarity comparison of signals in first output 238 and the second input 234. This calculation measures the coherence between the evidence of sampling from the environment and the expected inference or spatial transition at each FCN 200. Therefore, the CH parameter measures the cognitive coherence at each FCN 200, providing valuable information on changes of cognitive status and self-performance.

In some embodiments, the first output signal outputted via the first output 238 can be reduced in size by filtering only the dimensions within the sub-domain they observe.

The FCNs 200 may replicate themselves to create new layers of the hierarchical network. This may be accomplished by creating new FCNs 200 with higher precision. This may be accomplished by increasing the SA parameter of the child FCN. In some embodiments, the new FCNs 200 also have a reduced domain focus. For example, if an FCN 200 is processing in a domain, the new FCNs 200 may process on a sub-domain of that domain. Each new FCN 200 may operate on a different sub-domain of the original domain. These sub-domains may overlap. In this way, key features in that only appear in part of the domain may receive focus in the sub-domain.

As a consequence of a replication operation of the FCNs 200, a top-down hierarchy is created in such a configuration where the seed FCN SA parameter is set to low values, providing low precision cognition and TA parameter is set to high values. As the different items in the memory 210 have a specific new FCN 200 for their composition of tuples with higher SA value and lower TA values, the overall cognition is performed in higher spatial and shorter sequence context precision, producing an escalation of the cognition effect. This allows the hierarchical network to, from a system-level perspective, to perform invariant archetyping and inference without any precision parameter. Advantageously, this is accomplished without the need for a central processing system to oversee the replication and subdivision, greatly reducing the overhead for the system. It also removes the reliance on complex genetic algorithms and HMIs.

Replication is performed based on the actual features detected in the tuples by the comparisons. No external or prior knowledge of the domain or features in the tuples is required and the hierarchical network will naturally occur in an unsupervised manner.

Hence, a hierarchical network making use of the FCNs 200 may be defined as a memorization component that, in an unsupervised manner, creates a distributed knowledge representation with the essence of the observed states of the domain and produces maximum inference complementation, increasingly to maximum levels of precision with no external parameters.

The FCNs 200 may be implemented in software. The processor 220 may be a single processor for each FCN 200 in a hierarchical network, or may be a dedicated processor for the specific FCN 200, or be managed from a unique processor using a distributed computation emulation technique. Likewise, the memory 210 may be dedicated memory or allocated memory from a common memory for each FCN 200. By implementing the FCNs 200 in this manner, the available processing and memory storage resources for the hierarchical network may be used to generate additional FCNs 200 and layers of the hierarchy as needed.

Example Computer System

Figure 3:
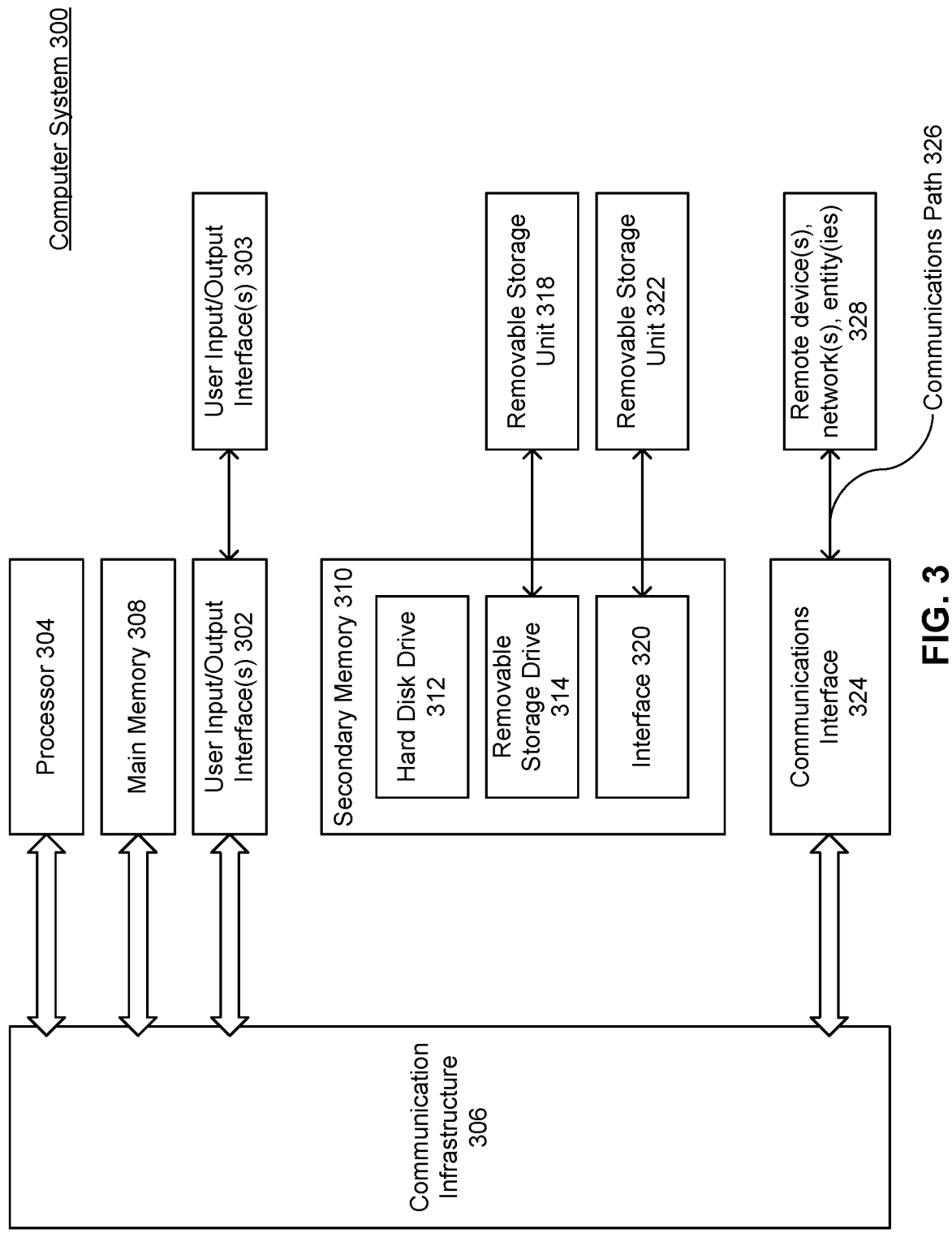
FIG. 3 illustrates a block diagram of a computing system, according to some embodiments.

Various embodiments may be implemented, for example, using one or more computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a bus or communication infrastructure 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPGPU), the GPU may be particularly useful in at least the image recognition and machine learning aspects described herein.

Additionally, one or more of processors 304 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or secondary memory 310. Secondary memory 310 may include, for example, a main storage drive 312 and/or a removable storage device or drive 314. Main storage drive 312 may be a hard disk drive or solid-state drive, for example. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 600 to communicate with external or remote devices 328 over communication path 326, which may be wired and/or wireless (or a combination thereof), and which may include any combination of LANs, WANs, the Internet, etc. Control logic and/or data may be transmitted to and from computer system 600 via communication path 326.

Computer system 300 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 300 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), YAML Ain't Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Scala, Clojure, Elixir, Swift, Go, Perl, PHP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Emberjs, DHTMLX, Vue, React, Electron, and so on, among many other non-limiting examples.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

Figure 4:
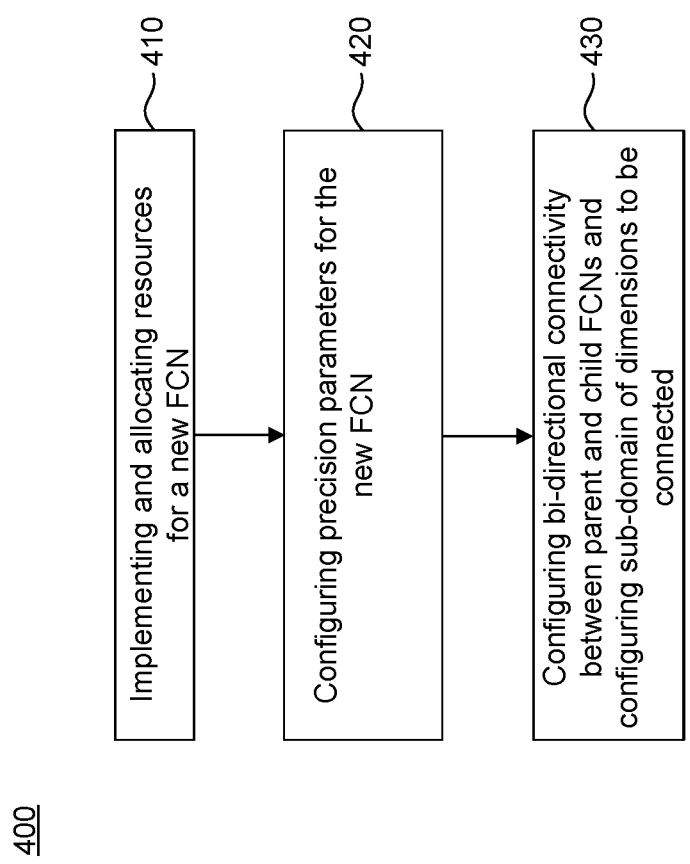
FIG. 4 is a flow chart illustrating a method for performing self-replication of a fractal cognitive computing node, according to some embodiments.

FIG. 4 depicts a method 400 for performing self-replication or generating new layers of a hierarchical network, according to some embodiments. This method 400 is an example of the replicating functionality of the FCNs 200.

It should be appreciated that this method 400 is performed in hierarchical networks by the FCNs. Each parent FCN that replicates its own child layers performs the method 400 as part of the hierarchical network. However, no centralized control is required to perform or regulate the method 400.

In 410, a new FCN is implemented and resources are allocated for the FCN. This may include allocating or assigning processing resources and memory for the FCN. The creation of a new FCN may be triggered by the repeated recall of similar patterns stored in the memory by input signals. In some embodiments, a set of new FCNs may be implemented for a given parent FCN. Step 410 may be performed for all of these, as necessary.

In 420, the new FCN precision parameters are configured. The SA parameter and other parameters may be set by the parent FCN. Setting the SA parameter may include increasing or self-tuning the SA parameter to increase precision of comparisons in the child FCN and may include decreasing or self-tuning of TA parameter to reduce the transitional context. The domain of the child FCN may be set based on the domain of the parent FCN based on the original repeated pattern and their recall activity.

For example, SA parameters may be increased and TA parameters may decreased to increase precision in the child FCNs. This may be performed based on a pre-determined change or an adaptive internal tuning approach.

In 430, the bi-directional connections and configuration of sub-domains between parent and child and parent FCNs are configured. This may include establishing new connections between the parent FCN and the new FCN(s). The first output of each child FCN may be connected to the first input of its parent FCN and the first output of each parent to the second input of the child. In some embodiments, because the child FCNs have an increased precision, their outputs may combine into a full precision input for the parent FCN. Connections to external sources of tuples may also be updated from the parent FCN to the new child FCN.

Figure 5:
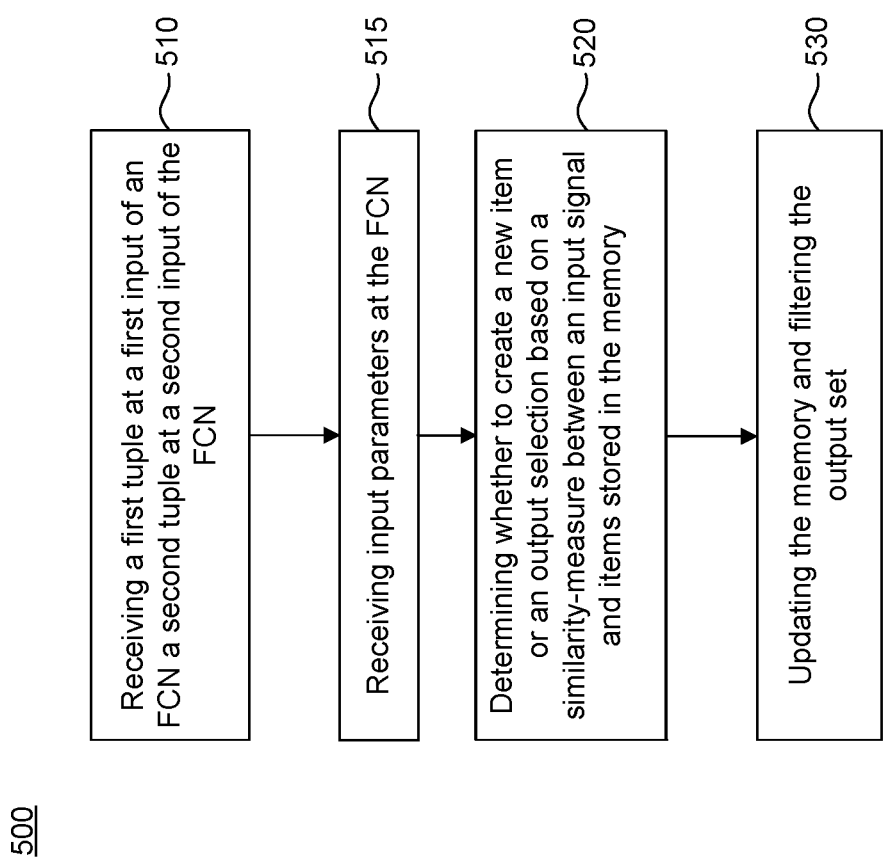
FIG. 5 is a flow chart illustrating a method for performing pattern recognition using a hierarchical network, according to some embodiments.

FIG. 5 depicts a method 500 for processing data in a hierarchical network, according to some embodiments. This method is performed by all of the FCNs in the hierarchical network, but no centralized control or coordination is employed, as the FCNs self-replicate and modify the hierarchical network in an unsupervised manner and from a precision scanning of a semantic domain. The method 500 is described in terms of how each FCN processes.

In step 510, the first input of an FCN receives a first signal at the first input and a second signal at the second input. These signals, or tuples, are the <key, value> pairs discussed above. The key is the identifier and the value is the activation magnitude.

In step 515, the FCN receives input parameters, such as the SA parameter, the TA parameter, or the CD parameter. This step is optional, as the parameters may be received one time, such as at the creation or replication of the FCN, and may be updated by the FCN thereafter.

In step 520, the FCN determines whether to create a new item in memory or what memory selection to recall based on a similarity measure between a set of input signal and items stored in memory of the FCN. The first signal and the second signal may be considered as the set of input signals. Some or all of the items stored in the memory may be used.

Determining the similarity measure may involve a processor in the FCN applying a comparison function configured for learning or recall procedures by comparing the set of input signal, such as the first input signal, the second input signal or a combination of the two with items stored in the memory of the FCN. The comparison function may calculate a similarity measure for each input with each of the stored items. The items stored in the memory represent previous inputs and are stored as at least a tuple with a <key, value>. Each item in stored memory that has a comparison score greater than the SA parameter is added to a temporal output set.

In step 530, the memory of the FCN is updated and the output set is filtered. The first output is determined based on the set determined in step 520. If the set created at step 520 has any items in it, then the first output is that set. In this case, no change is made to the memory. If the set is empty, then the output is set to the input tuples and the input tuples are added to the memory. The final output is calculated based on temporal one and the AF parameter, which may be used for filtering, as described above.

This process may be repeated each time new inputs are presented. As new inputs are added to memory, the FCN learns information at its precision level. It may pass known information on to the next based on the set output and may pass on new information by passing it directly to the next level.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents

What is claimed is:

1. A pattern recognition system, comprising:
one or more processors;
memory communicatively coupled to the one or more processors, the memory storing instructions configured to, when executed by the one or more processors, implement a set of fractal cognitive computing nodes (FCNs);
wherein the set of FCNs is configured into a hierarchical network, the set of FCNs having child FCNs at lower levels of the hierarchical network coupled to parent FCNs at higher levels of the hierarchical network, each lower level of the hierarchical network having a respective higher resolution than each higher level of the hierarchical network;
wherein each child FCN is configured to:
provide a first respective set of tuples to a respective parent FCN connected thereto, each tuple in the first respective set of tuples comprising a first respective key and a first respective value, the first respective key being a first respective identifier of the tuple and the first respective value being a first respective magnitude of activation of the first respective identifier;
receive a second respective set of tuples from the respective parent FCN connected thereto or a respective input connection, each tuple in the second respective set of tuples comprising a second respective key and a second respective value, the second respective key being a second respective identifier of the tuple and the second respective value being a second respective magnitude of activation of the second respective identifier, the respective input connection providing data to be analyzed by the pattern recognition system;
wherein each parent FCN is configured to receive the first respective set of tuples from and provide the second respective set of tuples to respective child FCNs connected thereto; wherein each FCN is configured to:
determine, using the one or more processors, a respective similarity measure between each stored tuple of a set of tuples in the memory and a respective set of input tuples, the respective set of input tuples comprising the first respective set of tuples from a respective child FCN or the respective input connection, the second respective set of tuples from respective parent FCN, or both;
compare, using the one or more processors, the respective similarity measure to a spatial attention (SA) parameter;
in response to the respective similarity measure being lower than the SA parameter, add the stored tuple in the memory that corresponds to the respective similarity measure to a respective output set;
in response to each of the respective similarity measures being greater than the SA parameter, add the respective set of input tuples to the respective output set and a new stored tuple in the memory;
assign the respective output set as the first respective set of tuples, the second respective set of tuples, or both for the FCN;
determine whether a self-replication criterion is met based on content of the stored set of tuples and based on semantic or relationships between tuples; and
in response to determining that the self-replication criterion is met, replicate itself into one or more respective child FCNs at a respective lower level of the hierarchical network, wherein a first FCN replicates itself into a first new child FCN, the replicating comprising:
allocating first processing resources from the one or more processors to the first new child FCN;
allocating first memory resources from the memory to the first new child FCN;
increasing the SA parameter of the first new child FCN; and
connecting the first new child FCN into the hierarchical network according to first one or more keys of first one or more tuples in the first FCN,
wherein the first new child FCN processes tuples at a first sub-domain of a domain of the first FCN; and
wherein the pattern recognition system is configured to output the respective output sets for FCNs at a highest level of the hierarchical network.

2. The pattern recognition system of claim 1, wherein each FCN is further configured to receive a respective temporal attention (TA) parameter and to modify each stored tuple in the memory based on the respective TA parameter, wherein the respective TA parameter is a single-dimension value that indicates an amount by which to decrease an activation level of a value of a tuple.

3. The pattern recognition system of claim 1, wherein each FCN is further configured to receive a respective conditioning (CD) parameter and to modify a stored item in the memory based on the respective CD parameter, the stored items in the memory being stored tuples with a stored key and a stored value and further having a stored depth value, the stored depth value indicating a weight given to the stored tuple when determining the respective similarity measure for the stored item.

4. The pattern recognition system of claim 1, wherein each FCN is further configured to determine, using the one or more processors, a respective confidence measure of the respective output set, wherein the respective confidence measure is determined as a statistical grouping function over the respective similarity measures of each set of tuples in the respective sets stored in the memory, and to output the respective confidence measure.

5. The pattern recognition system of claim 1, wherein each FCN is further configured to determine, using the one or more processors, a respective coherence measure based on a similarity between the second respective set of tuples and each tuple in the respective output set, and to output the respective coherence measure.

6. The pattern recognition system of claim 1, wherein each FCN is further configured to receive a respective focus parameter and filter, by the one or more processors, a respective feature in at least some output tuples in the respective output set based on the respective focus parameter.

7. The pattern recognition system of claim 1, wherein the first FCN replicates itself into a second new child FCN, the replicating comprising:
allocating second processing resources from the one or more processors to the second new child FCN;

allocating second memory resources from the memory to the second new child FCN; and increasing the SA parameter of the second new child FCN; and connecting the second new child FCN into the hierarchical network according to second one or more keys of second specific one or more tuples in the first FCN; and wherein the second new child FCN processes tuples at a second sub-domain of the domain of the first FCN, the second sub-domain being a different sub-domain than the first sub-domain.

8. A method for performing pattern recognition using a hierarchical network made up of self-replicating fractal cognitive computing nodes (FCNs) arranged with a parent-child relationship in layers, the method comprising:

at each FCN in the hierarchical network:

performing a comparison between a respective set of input tuples and a respective set of tuples stored in a respective memory of the FCN, wherein the respective set of input tuples comprises a first respective set of tuples from a respective child FCN or an external input, a second respective set of tuples from a respective parent FCN; or both, the comparison determining a respective set of similarity measures, each similarity measure corresponding to a comparison between a tuple in the respective set of input tuples and a tuple in the respective set of tuples stored in the respective memory of the FCN;

in response to a respective similarity measure from the respective set of similarity measures being less than a similarity threshold, adding the respective set of tuples stored in the respective memory of the FCN that correspond to the respective similarity measure to a respective output set;

in response to each respective similarity measure in the respective set of similarity measures being greater than the similarity threshold, adding the respective set of input tuples to the respective output set and to the respective memory of the FCN;

determining whether a self-replication criterion is met based on content of the stored set of tuples and based on semantic or relationships between tuples;

in response to determining that the self-replication criterion is met, replicating itself into one or more respective child FCNs at a respective lower level of the hierarchical network;

creating a new layer in the hierarchical network by replicating a first FCN into a first new child FCN, the replicating comprising:

allocating first processing resources from one or more processors for the first new child FCN;

allocating first memory resources from available memory for the first new child FCN; and increasing the similarity threshold of the first new child FCN; and connecting the first new child FCN into the hierarchical network according to first one or more keys of first one or more tuples in the first FCN, wherein the first new child FCN processes tuples at a first sub-domain of a domain of the first FCN; and providing the respective output set to the respective parent FCN as the first respective set of tuples, to the respective child FCN as the second respective set of tuples, or to both;

wherein each tuple in the respective set of input tuples, the respective output set of tuples, a first respective tuple, and a second respective tuple comprise a respective key and a respective value, the respective key being a respective identifier of the tuple and the respective value being a respective magnitude of activation of the respective identifier; and wherein the respective external input provides respective external tuples to be analyzed by the hierarchical network.

9. The method of claim 8, further comprising receiving in at least one respective FCN of the hierarchical network a respective temporal attention (TA) parameter and modifying each respective tuple stored in the respective memory of the at least one respective FCN based on the respective TA parameter, wherein the respective TA parameter is a single-dimension value that indicates an amount by which to decrease an activation level of a value of a tuple.

10. The method of claim 8, further comprising receiving in at least one respective FCN of the hierarchical network a respective conditioning (CD) parameter and modifying the respective set of tuples stored in the respective memory of the at least one respective FCN based on the respective CD parameter, each tuple of the set of tuples stored in the respective memory further comprising a respective stored depth value, the stored depth value indicating a weight applied when determining the respective similarity measure for the tuple, the CD parameter indicating a change to make in the stored depth value.

11. The method of claim 8, further comprising determining a respective confidence measure of the respective output set, wherein the respective confidence measure is determined as a statistical grouping function over the respective similarity measures of each tuple of the set of tuples stored in the respective memory, and outputting the respective confidence measure.

12. The method of claim 8, further comprising determining a respective coherence measure based on a similarity between the respective set of input tuples and the respective output set of tuples, and outputting the respective coherence measure.

13. The method of claim 8, further comprising receiving in at least one FCN of set of FCNs in the hierarchical network a respective focus parameter and filtering a respective feature in at least some output tuples in the respective output set based on the respective focus parameter.

14. The method of claim 8, further comprising the first FCN replicating itself into a second new child FCN, the replicating comprising:

allocating second processing resources from one or more processors to the second new child FCN;

allocating second memory resources from the available memory to the second new child FCN; and increasing a spatial attention (SA) parameter of the second new child FCN; and connecting the second new child FCN into the hierarchical network according to second one or more keys of second specific one or more tuples in the first FCN; and wherein the second new child FCN processes tuples at a second sub-domain of the domain of the first FCN, the second sub-domain being a different sub-domain than the first sub-domain.

15. A non-transitory computer readable storage medium having computer readable code thereon, the non-transitory computer readable storage medium including instructions configured to cause one or more processors of a computer system to perform operations comprising:

implementing a set of fractal cognitive computing nodes (FCNs), wherein the set of FCNs is configured into a hierarchical network, the set of FCNs having child FCNs at lower levels of the hierarchical network coupled to parent FCNs at higher levels of the hierarchical network, each lower level of the hierarchical network having a respective lower resolution than each higher level of the hierarchical network;

wherein each child FCN is configured to:

provide a first respective set of tuples to a respective parent FCN connected thereto, each tuple in the first respective set of tuples comprising a first respective key and a first respective value, the first respective key being a first respective identifier of the tuple and the first respective value being a first respective magnitude of activation of the first respective identifier;

receive a second respective set of tuples from the respective parent FCN connected thereto or a respective input connection, each tuple in the second respective set of tuples comprising a second respective key and a second respective value, the second respective key being a second respective identifier of the tuple and the second respective value being a second respective magnitude of activation of the second respective identifier, the respective input connection providing data to be analyzed by a pattern recognition system;

wherein each parent FCN is configured to receive the first respective set of tuples from and provide the second respective set of tuples to respective child FCNs connected thereto;

wherein each FCN is configured to:

determine, using the one or more processors, a respective similarity measure between each stored tuple of a set of tuples in a memory and a respective set of input tuples, the respective set of input tuples comprising the first respective set of tuples from a respective child FCN or the respective input connection, the second respective set of tuples from respective parent FCN, or both;

compare, using the one or more processors, the respective similarity measure to a spatial attention (SA) parameter;

in response to the respective similarity measure being lower than the SA parameter, add the stored tuple in the memory that corresponds to the respective similarity measure to a respective output set;

in response to each of the respective similarity measures being greater than the SA parameter, add the respective set of input tuples to the respective output set and a new stored tuple in the memory;

assign the respective output set as the first respective set of tuples, the second respective set of tuples, or both for the FCN; and determine whether a self-replication criterion is met based on the content of the stored set of tuples and based on semantic or relationships between tuples; and in response to determining that the self-replication criterion is met, replicate itself into one or more respective child FCNs at a respective lower level of the hierarchical network, wherein a first FCN to replicate itself into a first new child FCN, the replicating comprising:

allocating first processing resources from one or more processors for the first new child FCN;

allocating first memory resources from available memory for the first new child FCN; and increasing the SA parameter of the first new child FCN; and connecting the first new child FCN into the hierarchical network according to first one or more keys of first one or more tuples in the first FCN, wherein the first new child FCN processes tuples at a first sub-domain of a domain of the first FCN; and wherein the pattern recognition system is configured to output the respective output sets for FCNs at a highest level of the hierarchical network.

16. The non-transitory computer readable storage medium of claim 15, wherein the instructions are further configured to cause the first FCN to replicate itself into a second new child FCN, the replicating comprising:

allocating second processing resources from one or more processors to the second new child FCN;

allocating second memory resources from the available memory to the second new child FCN; and increasing the SA parameter of the second new child FCN; and connecting the second new child FCN into the hierarchical network according to second one or more keys of second specific one or more tuples in the first FCN; and wherein the second new child FCN processes tuples at a second sub-domain of the domain of the first FCN, the second sub-domain being a different sub-domain than the first sub-domain.

\* \* \* \* \*

UNITED STATES PATENT AND TRADEMARK OFFICE
CERTIFICATE OF CORRECTION

PATENT NO. : 12,223,354 B2
APPLICATION NO. : 17/391575
DATED : February 11, 2025
INVENTOR(S) : Guinovart Page 1 of 1

It is certified that error appears in the above-identified patent and that said Letters Patent is hereby corrected as shown below:

In the Specification

In Column 4, Line 29, delete "HMIs" and insert -- HMMs --, therefor.

In Column 4, Line 59, delete "HMNI" and insert -- HMM --, therefor.

In Column 4, Line 63, delete "HMIs" and insert -- HMMs --, therefor.

In Column 9, Line 40, delete "HMIs" and insert -- HMMs --, therefor.

In Column 12, Line 41, delete "Emberjs," and insert -- Ember.js, --, therefor.

In the Claims

In Column 20, Claim 15, Line 7, after "on" delete "the".

Signed and Sealed this
Sixteenth Day of September, 2025

Coke Morgan Stewart
*Acting Director of the United States Patent and Trademark Office*